(12) United States Patent
Gooch

(10) Patent No.: US 7,386,497 B1
(45) Date of Patent: Jun. 10, 2008

(54) SYSTEM AND METHOD FOR TRADING AN INSTRUMENT

(75) Inventor: Michael Gooch, Rumson, NJ (US)

(73) Assignee: GFI Group, Inc., New York, NY (US)

( * ) Notice: Subject to any disclaimer, the term of this patent is extended or adjusted under 35 U.S.C. 154(b) by 0 days.

(21) Appl. No.: 09/447,319

(22) Filed: Nov. 22, 1999

(51) Int. Cl.
  *G07Q 40/00* (2006.01)
(52) U.S. Cl. ............................................ 705/37; 705/26
(58) Field of Classification Search .................. 705/37, 705/35, 36, 26, 27
  See application file for complete search history.

(56) References Cited

U.S. PATENT DOCUMENTS

| | | | |
|---|---|---|---|
| 2,134,118 | A | 10/1938 | Foss |
| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,823,265 | A | 4/1989 | Nelson |
| 4,903,201 | A | 2/1990 | Wagner |
| 4,980,826 | A | 12/1990 | Wagner |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,243,331 | A | 9/1993 | McCausland et al. |
| 5,258,908 | A | 11/1993 | Hartheimer et al. |
| 5,262,942 | A | 11/1993 | Earle |
| 5,297,031 | A | 3/1994 | Gutterman et al. |
| 5,305,200 | A | 4/1994 | Hartheimer et al. |

(Continued)

FOREIGN PATENT DOCUMENTS

EP 000952536 A1 * 10/1999

(Continued)

OTHER PUBLICATIONS

BoxLot Online Auction: Review Auction & Bidding Formats www.boxlot.com/formats.html, download date: Sep. 22, 1999.*

(Continued)

*Primary Examiner*—Hani M. Kazimi
(74) *Attorney, Agent, or Firm*—Kenyon & Kenyon LLP

(57) ABSTRACT

A method and system for trading an instrument such as a financial instrument. A customer generates a request for a price and provides data concerning the instrument for which the price is sought. The price requested may be a price to buy (bid) or sell (offer) the instrument. The request is provided to a group of users via a communication network. Each user is capable of at least generating a price response to the request. The user responses are provided to the customer via the communication network. The best price response generates a first indication to the user which provides such price response. All other users which provide a price response are provided with a second indication, which is different from the first indication and which does not include the best price. At any time, the customer may accept any pending response, amend the request, or cancel the request. The users may adjust their price responses up or down, or cancel their response, at any time prior to customer acceptance, taking into account whether their response generates the first indication or second indication.

27 Claims, 3 Drawing Sheets

U.S. PATENT DOCUMENTS

| | | |
|---|---|---|
| 5,375,055 A | 12/1994 | Togher et al. |
| 5,508,913 A | 4/1996 | Yamamoto et al. |
| 5,640,569 A | 6/1997 | Miller et al. |
| 5,655,088 A | 8/1997 | Midorikawa et al. |
| 5,689,652 A | 11/1997 | Lupien et al. |
| 5,710,889 A | 1/1998 | Clark et al. |
| 5,715,402 A | 2/1998 | Popolo |
| 5,727,165 A | 3/1998 | Ordish et al. |
| 5,774,873 A | 6/1998 | Berent et al. |
| 5,774,880 A | 6/1998 | Ginsberg |
| 5,787,402 A | 7/1998 | Potter et al. |
| 5,794,207 A | 8/1998 | Walker et al. |
| 5,794,219 A | 8/1998 | Brown |
| 5,818,914 A | 10/1998 | Fujisaki |
| 5,826,244 A | 10/1998 | Huberman |
| 5,835,896 A | 11/1998 | Fisher et al. |
| 5,842,178 A | 11/1998 | Giovannoli |
| 5,857,176 A | 1/1999 | Ginsberg |
| 5,890,138 A | 3/1999 | Godin et al. |
| 5,905,974 A | 5/1999 | Fraser et al. |
| 5,905,975 A | 5/1999 | Ausubel |
| 5,915,209 A | 6/1999 | Lawrence |
| 5,924,082 A | 7/1999 | Silverman et al. |
| 5,926,801 A | 7/1999 | Matsubara et al. |
| 5,950,176 A | 9/1999 | Keiser et al. |
| 5,963,923 A | 10/1999 | Garber |
| 5,966,699 A | 10/1999 | Zandi |
| 5,987,419 A | 11/1999 | Hachino et al. |
| 6,012,045 A | 1/2000 | Barzilai et al. |
| 6,023,685 A | 2/2000 | Brett et al. |
| 6,026,383 A | 2/2000 | Ausubel |
| 6,029,146 A | 2/2000 | Hawkins et al. |
| 6,041,308 A | 3/2000 | Walker et al. |
| 6,044,363 A | 3/2000 | Mori et al. |
| 6,058,379 A | 5/2000 | Odom et al. |
| 6,064,981 A | 5/2000 | Barni et al. |
| 6,161,099 A | 12/2000 | Harrington et al. |

FOREIGN PATENT DOCUMENTS

WO      WO98/34187 A1 * 8/1998

OTHER PUBLICATIONS

BoxLot On-line Auction; Review Auction & Bidding Formats, www.boxlot.com/formats.html, Download date Sep. 22, 1999.*

Rockoff, T.E. and Groves, M., "Design of an Internet-Based System for Remote Dutch Auctions," *Internet Research-Electronic Networking Applications and Policy,* vol. 5, No. 4, 1995.

* cited by examiner

SYSTEM AND METHOD FOR TRADING AN INSTRUMENT

FIELD OF THE INVENTION

The present invention relates to a system and method for buying and/or selling a particular instrument, such as a financial instrument.

BACKGROUND INFORMATION

In a conventional open auction, each potential buyer of an instrument knows the bids of the other potential buyers. Such an open auction allows the potential buyers to take advantage of their knowledge of the details of the other bids and can result in the winning bidder obtaining the instrument for a lesser value than he or she would otherwise have been willing to pay. Thus, providing information regarding other potential buyers' bids to each potential buyer may be detrimental to the seller.

Alternatively, in a sealed bid auction, potential buyers do not know any details of the bids of others. Such a system also can operate to provide less than a best bid price, because potential buyers may hesitate to adjust bids since they may simply be "bidding against themselves."

Thus, there is a need to create a system for auctions which encourages bidders (or offerors) to present their best possible bids (or offers) in an efficient manner.

SUMMARY OF THE INVENTION

The present invention relates to a method and system for trading an instrument, such as a financial instrument. A customer generates a request for a price and provides data concerning the instrument for which the price is sought. The price requested may be a price to buy (bid) or sell (offer) the instrument. The request is provided to a group of users via a communication network. Each user may provide a price response to the request. The user responses are provided to the customer via the communication network. The best price response generates a first indication to the user who provided such price response. All other users providing a price response are given a second indication, which is different from the first indication and which does not identify the best price. At any time, the customer may accept any pending response, make a counter-request to any or all users, or withdraw from the auction. Until the customer accepts a price response or withdraws from the auction, each user may adjust his or her price response (up or down) or cancel the response, at any time, taking into account whether the response generates the first indication or the second indication.

DETAILED DESCRIPTION OF THE INVENTION

Figure 1:
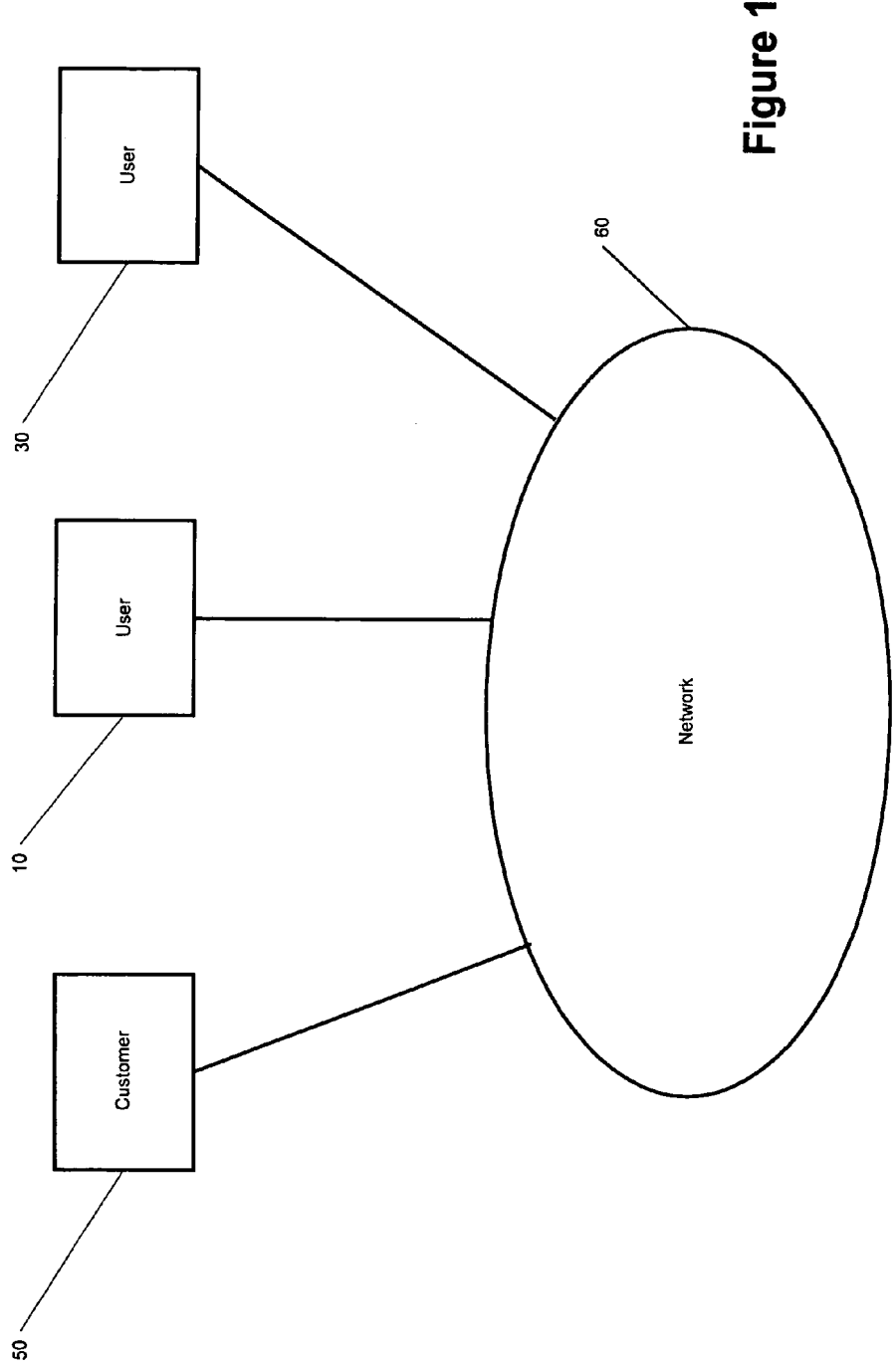
FIG. 1 shows an exemplary embodiment of a system according to the present invention.

FIG. 1 shows an exemplary embodiment of a system 1 according to the present invention. A system 1 may be utilized as a vehicle for providing information, execution of trades and/or electronic commerce. In particular, the system 1 may be utilized to arrange trades of instruments for users and may charge various commissions for executions of such trades. In addition, the system 1 may provide users with real-time pricing data, analyses and risk management for the instruments. The instruments may be financial instruments such as stocks, bonds, derivatives and other financial products, or could be any other instrument suitable for purchase or sale. The users of the system 1 may be hedge funds, pension plans, corporations, broker dealers, banks, individuals, or any other suitable user. The customers can be any suitable party desiring to purchase or sell an instrument using the invention.

The system 1 preferably includes two "sides"—a requesting side and a responding side. The requesting side includes one or more customers who request others to bid and/or offer a particular instrument. The responding side includes one or more users who are capable of generating a response to the request of the requesting side. A particular entity could be on the requesting side in one transaction and on the responding side in another transaction. For purposes of simplification, the requesting side will be referred to as "a customer," while the responding side will be referred to as "a user."

The system 1 includes at least one customer 50 a plurality of one users (e.g., user 10 and user 30). The customer 50 and the users 10, 30 may communicate with the system via a communication network 60. The network 60 may be an internet, intranet, dedicated network, telephone network, wireless network, etc. At any time, customer 50 may communicate with either one user, a group of users, or all users, as it desires, to the extent permitted by the rules of the system 1. Such private communications may be in a form of fax, e-mail, real-time chats, telephone, etc.

Each participant of the system 1 preferably has a computer which is capable of communication with a data processing system (such as a conventional computer or a mainframe). Preferably, the data processing system includes a computer-readable storage device that stores a particular software application. The software application allows execution of a method according to the present invention. The participant computer can be a personal computer or a computer terminal.

In another exemplary embodiment of the system 1, the participants may use "dumb terminals" for communications among themselves. The system 1 may use a thin client environment whereby the participant is sharing time on a particular server.

Figure 2:
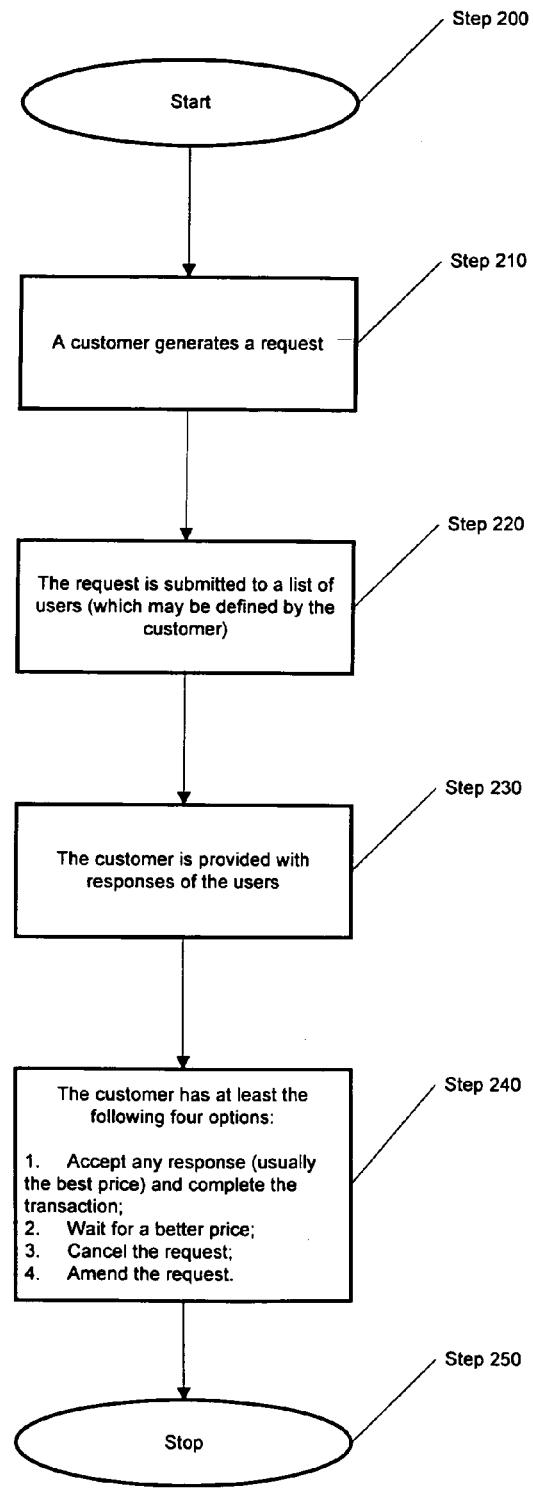
FIG. 2 shows a method according to the present invention as seen by a customer.
Figure 3:
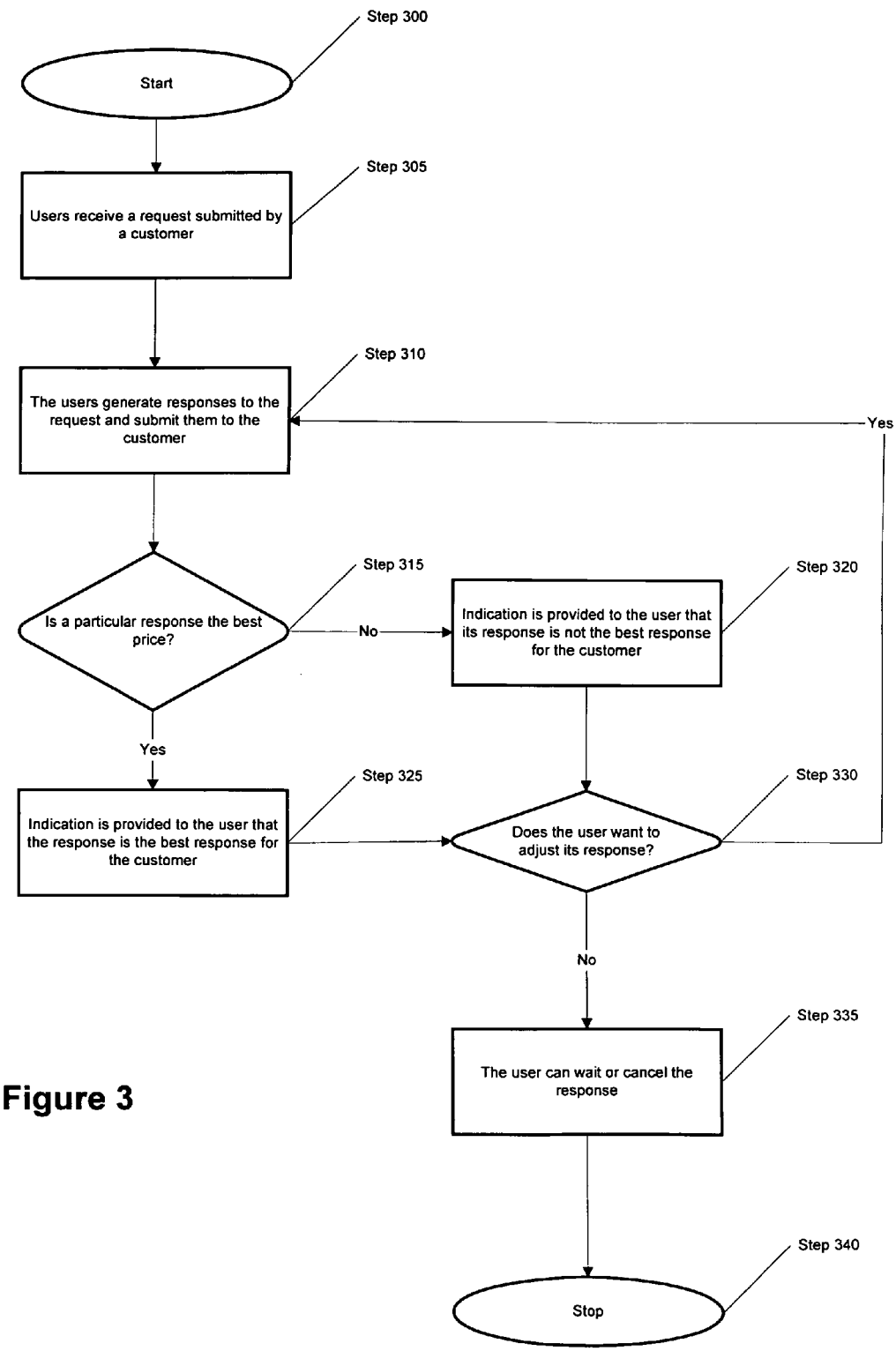
FIG. 3 shows a method according to the present invention as seen by a user.

FIGS. 2 and 3 show an exemplary embodiment of the method according to the present invention. In particular, FIG. 2 shows steps of the method for the requesting side (or customer) and FIG. 3 shows steps of the method for the responding side (or users).

Referring to FIG. 2, in step 210, a customer 50 generates a request. A basic request is a price request which may include, for example, a request for a bid to buy the instrument or a request for an offer to sell the instrument. A customer may make multiple requests. For example, the customer may issue a request for bids to buy an instrument and at the same time issue a request for offers to sell the instrument.

The customer request may include an identifier of the instrument (e.g., a stock symbol); a quantity of the instrument (e.g., 40 shares); a type of an action requested (e.g., bid to buy or offer to sell); a period when the offer is open (e.g., offer is open between 9:00 am and 9:30 p.m.). The request may further include a plurality of predefined conditions. For example, the request may identify if the customer 50 is willing to accept anything but a full quantity of the financial instrument (e.g., "I would like to buy 1,000 shares of XYZ, but will entertain offers seeking to sell me 500 shares"). The request may include a plurality of subrequests (e.g., "I would like to buy 100 shares of ABC, and sell 500 shares of XYZ"). The request may be conditioned upon a predetermined event (e.g., "I am seeking to sell 100 shares of XYZ, but will sell 200 shares if the bids are above $90").

Once the request is completed, it is entered and stored in the system and is communicated to a list of predefined users 10, 30 via the network 60. (Step 220.) For each transaction the customer preferably can establish the initial list of users or can operate from a default list of users established by the user or the rules of the system 1. The customer 50 preferably may add and/or delete a particular user to/from the list at any time. Such addition and/or deletion may be done in real time or periodically. Preferably, the customer 50 may define groups of users. Such groups may be ranked (e.g., group A will get the request first), categorized (e.g., group B specializes in derivatives), or organized in any form desired by the customer. The groups may be ranked manually by the customer 50 or automatically based on predetermined parameters (e.g., past performance, reputation, etc.).

After the request is submitted to the selected users 10, 30, the users may generate responses according to the method which is described in more detail below and shown in FIG. 3. After the users 10, 30 generate the responses to the request, such responses are stored in the system and communicated back to the customer 50. (Step 230.)

The customer 50 preferably is provided with at least the following four options upon receiving responses to the requests. (Step 240.) First, the customer 50 may accept the response of any user. If the response of a user is accepted by the customer 50, a settlement procedure is initiated. During the settlement procedure, the customer 50 and the user exchange predetermined settlement information, either through the system or "off-line," such as via private communication or a clearing agent, as appropriate. Once a response is accepted, the request and all of the responses to that request are eliminated from display on the monitor of all participating users.

If the customer 50 is not satisfied with any of the responses by the users 10, 30, the customer 50 may wait for a better response (e.g., a lower price if the customer 50 is seeking offers and a higher price if the customer 50 is seeking bids). A better price could be a better price as compared to all users, or the customer 50 could wait for a better price from a preferred user. The customer 50 may, but is not required to, notify the users 10, 30 that none of the responses is acceptable. In addition, the customer 50 may extend, limit or otherwise condition a time period for further response by the users 10, 30. The customer 50 also could extend the request to additional users.

Alternative to accepting a response, or awaiting additional responses, the customer 50 may cancel the request partially or completely. If the customer 50 cancels the request, such cancellation is transmitted to all users. All the responses to the canceled request are eliminated from the system 1. If the request contains more than one subrequest, then the customer 50 may cancel one or more subrequests. For example, if the request includes a first subrequest to buy XYZ stock and a second subrequest to sell ABC stock, then the customer 50 may cancel the first subrequest and keep the second subrequest. Subsequently, all the users are notified that the request is completely or partially canceled, and all of the responses to the canceled portion of the original request are eliminated from the system.

Finally, the customer 50 may amend the request, or make a counter-request. The request may be amended by the customer 50 at any time before a response to the request is accepted by the customer 50. The customer 50 may amend any of the parameters of the original request. The customer 50 may change the time period of the request, the quantity of shares, etc. All users are notified of the amended request. All of the responses to the originally submitted request are eliminated, and new responses can then be submitted. A counter-request could be submitted to any or all participating users, or even to new users which did not receive the original request. The customer can enter a counter-request into the system, or could privately communicate the counter-request to desired users. The customer also could select one or more users and enter into private negotiations with those users.

As mentioned above, FIG. 3 shows the steps of the responding side, or the users 10, 30. Once a request is submitted by the customer 50 (step 220), the request is provided to the users 10, 30 via the network 60. (Step 305). The users 10, 30 may prepare responses to the request.

The users 10, 30 submit the responses to the request via the network 60. (Step 310.) For example, in response to a request for bids to buy one hundred shares of XYZ stock, the user 10 might bid to buy from the customer 50 one hundred shares of XYZ stock for $100 per share, while the user 30 might bid $95 for the same shares. If a particular response is the best price bid or offered (step 315), then the user who submitted that response is provided with a first indication advising the user that the response is the best price. (Step 325.) Generally, the first indication may be displayed to the user via a sound, a color of a font, a flashing screen, a fax, e-mail or other suitable predetermined means. However, if the response of a particular user is not the best price bid or offered, then a second indication, which is different than the first indication, is provided to such user. The second indication does not identify the best price. The best price determination can be made, for example, using a computer processor which receives data relating to each response and determines the best price response.

If the same price is offered by more than one user, and such price is the best price, then only the user who was the first to offer such price would receive the first indication. Other users, who also offered the best price, but after the first user, would receive the second indication.

If the users 10, 30 wish to adjust their responses (e.g., change their respective bid or offered prices), then steps 310 through 330 are repeated, and the new responses are provided to the customer, generating either the first indication or the second indication. (Step 330.) Although the customer 50 may view all responses, preferably each user 10, 30 may view only his or her own response. Thus, the users 10, 30 are unaware of other users' responses.

As each user adjusts his or her price up or down, essentially generating a new response, a new best price may be established. The system 1 will then indicate (by the first indication) to the user submitting the best price that the new response has generated the best price, and will indicate to the user which previously had generated the best price that the old price is no longer the best price. In response, any user can adjust his or her price in an attempt to achieve the best price response. At any time, the customer 50 can accept any of the pending responses. Likewise, any user may cancel a pending response up until the point that the price is accepted by the user. The system preferably monitors the responses in essentially real-time to continually detect the price response and transmit the first or second indication to the appropriate users. By blinding each user to the responses of other users, but for an indication of whether his or her own response has provided the best price, the system according to the present invention is designed to encourage bidding in response to the request which will quickly and efficiently establish a market price for the instrument.

Optionally, a user of the system 1 may utilize "a topped-and-out" procedure. By employing a topped-and-out procedure, the user advises the system to cancel the response if at any point it is not the best price response. For example, the user 10 could generate a first response which offers to buy XYZ stock for $100 per share and, the user 30 could generate a second response which offers to buy XYZ stock for $101 per share. If user 10 has employed a topped-and-out option, since the second response is the best response for the customer 50, the first response of the user 10 would be eliminated from the system 1.

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A method for trading an instrument, comprising the steps of:
    providing a request for a price of the instrument from a customer to a plurality of users via a communication network, the request including request data concerning the instrument;
    receiving at least one response to the request from the plurality of users, the at least one response including a user price for the instrument;
    providing the at least one response to the customer via the communication network;
    determining a best price response to the request based on the at least one response, wherein the best price response is a best one of the at least one response received from the users;
    providing a first indication to the user who provided the best price response, the first indication indicating that the response is the best price response; and
    providing a second indication to the users who did not provide the best price response, the second indication indicating that the response is not the best price response, the first and second indications being different from one another;
    wherein the users, taking into account whether the first indication or the second indication is provided, adjust or cancel a corresponding response at any time before the customer accepts the best price response,
    wherein the request is for one of a bid to buy the instrument and an offer to sell the instrument,
    wherein the first indication is not an acceptance, and the second indication is not a rejection, and
    the second indication does not indicate what the best bid is so that users receiving the second indication do not know the best bid.

2. The method according to claim 1, further comprising the step of:
    eliminating a particular response of the at least one response if the particular response is not the best price response.

3. The method according to claim 1, wherein the request data include at least one of an identifier of the instrument, pricing information of the instrument, and quantity information for the instrument.

4. The method according to claim 3, wherein the request data further include at least one predetermined condition.

5. The method according to claim 1, further comprising the steps of:
    initiating a settlement procedure when the user accepts a response.

6. The method according to claim 1, further comprising the step of:
    eliminating the request by the customer when the customer indicates the request is no longer valid.

7. The method according to claim 1, further comprising the steps of:
    amending the request at the direction of the customer; and
    providing the amended request to the plurality of users via the communication network.

8. The method according to claim 1, wherein the first and second indications are provided by a predetermined signal selected from the group consisting of one or more of visual indications and sound indications.

9. The method according to claim 1, further comprising the step of:
    providing at least one of pricing data, risk management data, and analysis data for the instrument to the plurality of users.

10. The method according to claim 1, wherein the instrument is selected from the group consisting of a stock, a bond, a treasury bill, and a derivative.

11. The method according to claim 1, further comprising the step of:
    initiating a private communication between the customer and one of the plurality of users selected by the customer.

12. The method according to claim 11, wherein the private communication includes at least one of a fax, an e-mail, and a real-time chat channel.

13. The method according to claim 1, wherein the request includes at least one subrequest.

14. The method according to claim 1, wherein the communication network includes at least one of an Internet, a dedicated network, a telephone network, and a wireless network.

15. The method according to claim 1, further comprising the step of:
    generating at least one predetermined group of the plurality of users.

16. A system for trading an instrument, comprising:
    a communication network;
    a first computer for transmitting a request for a price of the instrument from a customer via the communication network, the request including request data; and
    at least one second computer for receiving the request via the communication network, the at least one second computer transmitting at least one response to the request from at least one user to the first computer via the communication network,
    wherein the first computer determines a best price response to the request based on the at least one response, the first computer transmitting a first indication to the user who provided the best price response, the first indication indicating that the response is the best price response, the first computer transmitting a second indication to the users who did not provide the best price response, the second indication indicating that the response is not the best price response, the first and second indications being different from one another, and the request is for one of a bid to buy the instrument and an offer to sell the instrument,
    wherein the first indication is not an acceptance, and the second indication is not a rejection, wherein the users, taking into account whether the first indication or the second indication is provided, adjust or cancel a corresponding response at any time before the customer accepts the best price response, wherein the best price response is a best one of the at least one response received from the users, and the second indication does not indicate what the best bid is so that users receiving the second indication do not know the best bid.

17. A system for trading an instrument, comprising:

a first computer;

a second computer for transmitting a request for a price of the instrument from a customer to the first computer, the request including request data; and at least one third computer for receiving the request via the first computer, the at least one third computer transmitting to the first computer at least one response to the request from at least one user, wherein the first computer determines a best price response to the request based on the at least one response, the first computer transmitting a first indication to the user who provided the best price response, the first indication indicating that the response is the best price response, the first computer transmitting a second indication to the users who did not provide the best price response, the second indication indicating that the response is not the best price response, the first and second indications being different from one another, and the request is for one of a bid to buy the instrument and an offer to sell the instrument, wherein the first indication is not an acceptance, and the second indication is not a rejection, wherein the users, taking into account whether the first indication or the second indication is provided, adjust or cancel a corresponding response at any time before the customer accepts the best price response, wherein the best price response is a best one of the at least one response received from the users, and the second indication does not indicate what the best bid is so that users receiving the second indication do not know the best bid;

wherein the first computer, the second computer and the third computer are coupled to a communication network to provide communications among the computers.

18. A computer-readable storage medium storing a set of instructions, the set of instructions capable of being executed by a processor to provide for trading of an instrument, the set of instructions performing the steps of:

providing a request for a price of the instrument from a customer to a plurality of users via a communication network, the request including request data concerning the instrument;

receiving at least one response to the request from the plurality of users, the at least one response including a user price of the instrument;

providing the at least one response to the customer via the communication network;

determining a best price response to the request based on the at least one response, wherein the best price response is a best one of the at least one response received from the users;

providing a first indication to the user who provided the best price response, the first indication indicating that the response is the best price response; and providing a second indication to the users who did not provide the best price response, the second indication indicating that the response is not the best price response, the first and second indications being different from one another;

wherein the users, taking into account whether the first indication or the second indication is provided, adjust or cancel a corresponding response at any time before the customer accepts the best price response, wherein the request is for one of a bid to buy the instrument and an offer to sell the instrument, wherein the first indication is not an acceptance, and the second indication is not a rejection, and the second indication does not include what the best bid is so that users receiving the second indication do not know the best bid.

19. The computer-readable storage medium according to claim 18, wherein the set of instructions enable the customer to provide an amended request or a counter-request to the users at any time before the customer accepts the best price response.

20. The method according to claim 1, further comprising: providing an amended request or a counter-request from the customer to the users at any time before the customer accepts the best price response.

21. The system according to claim 16, wherein the customer is able to provide an amended request or a counter-request to the users at any time before the customer accepts the best price response.

22. The system according to claim 17, wherein the customer is able to provide an amended request or a counter-request to the users at any time before the customer accepts the best price response.

23. The system according to claim 17, wherein the communication network includes an intra-network.

24. The system according to claim 17, wherein the communication network includes an inter-network.

25. The system according to claim 17, wherein the communication network includes an Internet.

26. The system according to claim 17, wherein the communication network includes an inter-network and an intra-network.

27. The system according to claim 17, wherein the communication network includes at least one of an inter-network, an intra-network, a dedicated network, a telephone network, a wireless network, and an Internet.

* * * * *